United States Patent [19]

Wiener et al.

[11] 4,130,031
[45] Dec. 19, 1978

[54] WIRE STRIPPER

[75] Inventors: Hans Wiener, Täby; Hans Undin, Åkersberga, both of Sweden

[73] Assignee: Pressmaster AB, Stockholm, Sweden

[21] Appl. No.: 801,016

[22] Filed: May 26, 1977

[30] Foreign Application Priority Data

Jun. 9, 1976 [GB] United Kingdom ............... 23819/76
Oct. 6, 1976 [GB] United Kingdom ............... 41487/76

[51] Int. Cl.² .......................... H02G 1/12; B26B 29/00
[52] U.S. Cl. ..................................... 81/9.5 R; 30/91.2; 30/287; 30/293; 30/304
[58] Field of Search .................... 81/9.5 R, 9.5 B; 30/91.1, 91.2, 90.1, 287, 293, 298, 304

[56] References Cited

U.S. PATENT DOCUMENTS

| | | | |
|---|---|---|---|
| 2,133,005 | 10/1938 | Wollenweber | 81/9.5 R |
| 2,566,434 | 9/1951 | Toth et al. | 81/9.5 B |
| 2,752,676 | 7/1956 | Trickle | 30/91.2 |
| 3,254,407 | 6/1966 | Apa et al. | 30/91.2 |
| 3,800,418 | 4/1974 | Schlueter | 30/91.2 |
| 3,914,864 | 10/1975 | Prince | 30/91.2 X |
| 4,028,800 | 6/1977 | Matthews | 30/91.2 X |

Primary Examiner—Al Lawrence Smith
Assistant Examiner—James G. Smith
Attorney, Agent, or Firm—Karl F. Ross

[57] ABSTRACT

A wire stripper for removing the insulation from single-core or coaxial cable has a pair of elongated jaws which are hinged together at one end and are provided with a latch at the other end so that they can clamp the wire between them. One of the jaws carries a blade, preferably in a replaceable cartridge, adapted to penetrate into part of the periphery of the insulation of the wire while the other jaw is formed with a bed to receive the wire and hold it during penetration by the blade. One of the jaws is also provided with a ring or eye into which the user can insert a finger and thereby twirl the tool around to effect relative rotation of the tool and the wire to cut through the insulation over its entire circumference. The tool is then drawn off the wire axially or the wire is withdrawn axially from the tool to strip the severed length of insulation from the wire. When two axially spaced cuts are to be made, the replaceable cartridge is formed with two blades in parallel transversely spaced relation.

44 Claims, 19 Drawing Figures

WIRE STRIPPER

FIELD OF THE INVENTION

This invention relates to a device for removing sheathing from substantially rod-shaped articles and, more particularly, for stripping the insulation from electrical cables (such articles being hereinafter referred to as "the treated object"). More specifically, the present invention deals with an improvement in such a device in which the treated object rests initially upon a bed or support means and a cutting edge penetrates part of the sheathing, whereupon, by relative rotation of the device and the treated object arouns the longitudinal axis of the latter, the incision is extended around the entire circumference of the sheathing. The improved device is a compact tool of small size which at the same time is economic and fool-proof in operation, thus reducing rejects and/or the necessity to repeat the desheathing operation and which, furthermore, is easily adaptable for treated objects of different size and/or type such as, for example, either single-core or coaxial cables.

This invention also relates to an improved rivet assembly for use in such a device as hinge means for joining together two or more structural parts and has as an object to provide, inter alia, a rivet connection which can be disconnected and reconnected at least once and adapted to secure a first member pivotably to, and with respect to, a second member, the rivet assembly also enabling, in another application thereof, e.g. an apparatus housing to be opened, for the purpose of the inspection and/or repair, or the replacement of defective parts of the apparatus and reclosed in the same way as if a more expensive screw connection were used for holding the respective parts of the housing together.

BACKGROUND OF THE INVENTION

Conventional stripping tools or the like have substantially the shape of a pair of pliers with two pivotally connected jaws which continue into elongated handles as is the case with conventional pliers or tongs. The length of these handles is often a multiple of the length of the jaws or equivalent functional parts. Hence the overall length of the device is considerable so that it is inconvenient to carry or store, is relatively expensive to fabricate and often is less versatile than is desired or required.

OBJECTS OF THE INVENTION

It is the principal object of the invention to provide an improved device for the removal of a sheath from a rod-shaped workpiece which obviates the disadvantages of hitherto-known tools for this purpose, including the drawbacks noted above.

Another object is to provide an improved highly compact and versatile wire-stripping tool capable of removing the insulation cleanly from wire of a variety of types and sizes.

Yet a further object of the invention is to provide a readily manipulatable longlife and small-size tool for the purposes described.

It is a further object of the invention to provide an improved hinge joint for two mutually articulated jaws which is particularly suitable for use in an improved wire stripper, is highly reliable, is readily assembled and is of low cost.

SUMMARY OF THE INVENTION

These objects and others which will become apparent hereinafter are attained with a wire stripper according to the invention which comprises a pair of hingedly interconnected jaws which can be locked together at an end remote from their hinge, one of the jaws having a V-shaped bed for receiving the workpiece, i.e. a wire, while the other is formed with at least one blade adapted to penetrate the insulation opposite the bed along a secant, one of these jaws being provided at an end thereof with a ring or eye receiving a finger of the user and enabling the tool to be rotated about the axis of the workpiece to slice through the insulating sheath over the entire circumference thereof, the ring or eye being twirled around the finger during this rotation.

According to a feature of this invention, the finger ring or eye is provided on the aforementioned one of the jaws on an end thereof opposite the hinge. The ring or eye can form an arm of a spring-loaded lever which can releasably engage the other jaw to lock the two jaws together.

Still another feature of the invention resides in mounting the V-shaped bed on the jaw carrying same so that, in the locked position of the jaws, it can be moved toward and away from the blade-carrying jaw to adjust the device for different diameters of wire or different depths of penetration of the blade. To this end cam means, e.g. an inclined plane, can be provided on the bed-carrying jaw for displacing the bed. Preferably indexing means is provided to releasably retain the bed in a selected one of a plurality of adjustment positions.

Yet another feature of the invention provides that the blade is mounted in a cartridge which is removably housed in the blade-carrying jaw and is held therein by a detent means, e.g. a pawl, which can release the cartridge upon movement of the latching (locking) lever about its fulcrum in a sense opposite the locking direction. The latter jaw can also be provided with adjustment means engageable with the blade (e.g. a screw) to displace the blade toward the bed-carrying jaw, the blade having at least limited freedom of movement in this direction within its cartridge. Preferably the blade is held by a pivot in the cartridge, the pivot extending transversely to the plane of the blade.

According to the present invention, in a first aspect thereof, therefore, an appliance or device for removing the sheathing from substantially rod-shaped articles, in particular for stripping the insulation from electrical cables or the like, comprises cutting means adapted to penetrate the sheathing in at least one place in such a manner that by relative rotation between the article and the appliance the or each incision is extended over the entire circumference of the sheathing. The device comprises substantially coplanar and preferably elongated first and second jaw means and hinge means for pivotally connecting the said jaw means together. In the first jaw means, the cutting means is provided and adjacent thereto a bed or support means for retaining the treated object can be formed. In the second jaw means, there is provided opposite the said support means, counter-support means (i.e. the aforementioned bed) adapted to press the treated object onto the support means when the jaw means are closed one upon the other. The device also includes means for temporarily locking both jaw means in their closed position, the arrangement being such that the cutting means are adapted to protrude to a predetermined extent beyond the support means for effecting an intermittent incision to a predetermined depth. A gripping means, e.g. the finger ring or eye, is attahced to at least one of the jaw means for relative rotation of the appliance around the treated object.

Either of the support and counter-support means, or both, can have the form of at least one V-shaped or substantially semi-circular bed. The position of the counter-support means can preferably be adjustable in the direction to and from the support means, e.g. with the help of a slide adapted for movement to and from on the second jaw means and simultaneously for engagement by at least one inclined guiding face with a corresponding inclined guiding face on the counter-support means.

The two jaw means and/or their locking means are advantageously biased, e.g. by a spring, into their respective open position, so that upon opening of the locking means, the latter remains in the open position, and the jaw means spring into their open position. Preferably, the gripping means have the shape of an eye which can be threaded on a finger, and/or are integrated with the locking means in one piece. In the latter case the locking piece is preferably pivotally connected to one of the jaw means and provided with a protrusion for engagement with a contact element on the other jaw means.

The cutting means can in principle be constituted by one or more blades which have at least one cutting edge and are disposed adjacent the support means. Preferably, the blade is inserted in the first jaw means in an easily removable manner — e.g. retained by its terminal parts in slots and/or threaded (i.e. slipped on) by a hole, on a rod-shaped member — so that it can easily be replaced or turned around. It will be readily understood that by turning a blade which has an upper and a lower edge around a horizontal axis, a fresh cutting edge can be brought into position adjacent the support means. It will be equally easily understood that when the length of the blade is at least twice as long as the opertive zone adjacent the support means, also turning of the blade around the vertical axis will bring an unused portion of the edge into the operative position.

According to a particular advantageous embodiment of the present invention, the blade or blades are, however, not mounted directly into the first jaw means, but are placed in a removable insert, namely the cartridge, for which a corresponding recess is provided in the said first jaw means.

Thus not only can the blade or blades be positioned in the insert in a number of positions, but also the insert itself in the jaw means as will be explained in more detail later on, or the insert and blade(s) as whole can easily be replaced e.g. by a new insert with fresh blades or with blades adapted for a different cutting task.

The insert is advantageously retained in the jaw means by insert locking means which is operative at least in the open position of the appliance. In the closed position, the second jaw means, clapped on the first one, automatically prevents the insert from falling out.

The insert can preferably have the shape of the four walls of a box without bottom and top; in the edges of the insert, adjacent the operative zone of the blade or its cutting edge, at least one recess is arranged for unimpeded action of the cutting edge. Alternatively, these recesses can be formed as a continuation of the support means in the first jaw means or as these support means themselves, with larger recesses being then arranged instead in the first jaw means. The cutting blade or blades can, with the help of an opening therein, intermediate its two terminal parts, be threaded (slipped-on), on a rod-shaped member mounted either directly in the first jaw means or in the insert. Thus by rotation around said member the lower and upper edges of a blade with two edges can readily change places, e.g. when the insert is removed from the jaw means.

In the side walls of the insert which are perpendicular to the blade or blades (i.e. parallel with said rod-shaped member, if provided), slots for receiving the terminal parts of each blade can be provided. The slots can be used as well instead, as complementary to the said rod-shaped member. Further at least one central beam may be arranged in the insert to fill-out the space between the blades.

In the first jaw means are preferably arranged means for adjustment of the height position of an operative cutting edge or edges relative to the support means, i.e. the amount of the protrusion. Such adjusting means can be a cam means or the like, but preferably are constituted by at least one screw which is screwed into the first means from the outside and is adapted to engage at its other end, inside said first jaw means, the blade carrying the respective cutting edge. The part of the adjusting screw which is accessible from the outside is adapted for adjusting e.g. by means of a screwdriver or an Allen wrench. Preferably, an intermediate support such as a small plate is arranged between the screw or screws and the respective blades, allowing for different axial positions of the blades in the insert. By "axial" is meant in the present specification the direction of the axis of the treated object.

In a device according to the present invention, at least one blade has at least two cutting edges at different "height levels", i.e. protrusion levels. By such a level is meant the extent to which a cutting edge protrudes beyond the adjacent support means when in operative position.

In a simplest embodiment of such a blade, e.g. with fixation on said rod-shaped member the opening for the latter is positioned nearer the one cutting edge than the other. In an advantageous embodiment according to the present invention such a blade has a more complex shape, substantially defined by two adjacent congruous rectangular parallelograms, slightly displaced one relative the other. Advantageously, the terminal parts of such a blade are adapted for engagement by the said adjusting means, such as the adjusting screws, at constant levels despite the different protruding levels of the cutting edges.

In the stripping of single-core cables, a blade with cutting edges at different protrusion levels makes it impossible to choose one of the two values for the depth of the incision, by bringing either the more or the less protruding cutting edge into the operative position adjacent the support means.

The tool according to the present invention is particularly suitable for stripping coaxial cables. As is well-known, coaxial cables are electric conductor elements which have an inner conductor with an inner insulating cover and an outer conductor surrounding the latter (mostly having the function of a screen or shield) with an outer insulating cover. By contrast with other multipole cables, a coaxial cable has to have its insulation stripped-off in at least two different axially-spaced places, in order that the inner conductor as well as the outer conductor may be bared sufficiently for the purpose of making connections. The incision uncovering the inner conductor must be deeper than the incision uncovering the outer conductor, the former penetrating the inner and the outer insulating covers and the outer conductor, whereas the latter penetrates only the outer conductor.

The device according to the present invention is easily used for this purpose by including in its cutting means a first blade adapted for cutting by its cutting edge through the outer insulating cover, and, in axially-spaced relationship thereto, a second blade with its cutting edge adapted to cut through all layers with the exception of the inner conductor. Principally, different blades can be used for the first and second blades. However, by using blades of the abovementioned kind with at least two edges at different protruding levels, only one kind of blade need be provided, the difference in incision depth being achieved by mounting each blade in a different position.

The above-described special embodiment of a blade in the shape of the displaced parallelograms is particularly suitable for use in stripping coaxial cables, because ample possibilities of replacement of a worn edge are offered, as will be explained in greater detail hereinafter.

With coaxial cables, sometimes a different stripping length is desired for the outer conductor than for the inner insulating cover, the latter protruding beyond the stripped outer conductor, but to the same extent as the stripped inner conductor.

Then a third blade is added to the cutting means, intermediately the first and second one, and adapted to make the incision to the desired intermediate depth.

While it is immaterial from which direction a single-core cable is inserted into an appliance according to the present invention having a single blade, it is vital that a coaxial cable always be inserted only from one, the "correct" side. A suitable indicator means, such as color mark or protrusion, etc., is therefore provided to indicate the correct orientation.

It will be appreciated that the arrangement with a removable insert is not essential for the use of any of the above described particular blades or any particular number of blades. Any cutting means including one or more blades can be accomodated directly in the body of the first jaw means. The use of the insert, however, makes blade changes faster, simpler and safer and can be compared in its effects with the known cassette arrangement with films or recording tapes. It will be realized that by simple exchange of inserts, a given tool or stripper can easily be converted from one for stripping-core cables into one for stripping coaxial cables and vice versa. Moreover, inserts according to the present invention can easily be loaded with fresh blades so that, in contradistinction to the abovementioned cassette, only the parts which de facto are used, i.e. the blades, need to be rejected after some time.

According to a second aspect of the present invention, at least two strucural parts, e.g. the jaws mentioned previously, are joined hingedly together by first introducing a longitudinal hollow sleeve into aligned openings in the structural parts which are to be connected together, whereupon a rivet is introduced into the sleeve from one end thereof, said rivet having a head of greater width transversely to the axis of its shank than the envelope of the sleeve. The shank is constructed and arranged for being retained in the sleeve by friction and/or with the aid of adhesive or by deformation of its shape for engagement with, and disengagement from, the sleeve, i.e. without any substantial deformation of the sleeve, and so that, upon removal of the head, by a force acting on its outer end surface or a surface substantially parallel to the latter, the shank can be displaced along and within or out of the sleeve. The sleeve at its end remote from the head being secured to one of the parts.

According to the invention, a device in the form of a reusable rivet assembly for joining together at least two structural parts comprises a longitudinal hollow sleeve and at least one rivet having a head and a shaft, the rivet being receivable in the sleeve and retained therein by friction, an adhesive or deformation of its shape. The rivet is axially displaceable by the action of a force applied to one end of the shaft or to a surface substantially parallel to said end formed as a result of removal of the rivet head.

The shank and the sleeve can be held together only by friction, an adhesive or by relative engagement arising from deformation of the shank in such a way that it is disengageable from the sleeve, and the shank and/or the sleeve may also be made of a synthetic-resin material.

The rivet assembly differs materially from the prior-art devices in which the shank of a first rivet having a head is introduced into a somewhat larger hollow shank of a second rivet, which also has a head, and is secured there by the front parts of the shank of the first rivet being deformed by external pressure in such a way that it engages the interior of the shank and/or head portion of the second rivet by irreversible deformation of its shape. Such a rivet connection cannot be undone other than by complete destruction of the connection and, moreover, the rivets must be made of metal.

Advantageously, the sleeve is provided at one end with a flange acting as the securing means. The flange may in its outer parts resemble a rivet head, but it does not cover the central opening in the sleeve. The shank or shaft of the rivet can, in this embodiment, have the same length as the sleeve (or can even be longer) to be pushed out by the pressure on the natural front surface of the shaft which is accessible through the flange.

In another embodiment, the sleeve can be provided at one end with a head quite analogous to the rivet head, i.e. covering also the central opening in the sleeve. The sleeve thus has a blind hole. In this embodiment the length of the shaft of the rivet must be less than or equal to half the total length of the sleeve.

To open the connection, the head of the rivets is cut off or ground off to form a surface parallel to the front surface of the shaft at the opposite end. By pressure on this surface, the cut-off shaft is pressed deeper into the sleeve, until it reaches the bottom of the blind hole. The sleeve can now be removed in the direction in which its head lies, and at reassembly, a new rivet is pushed from the open side into the sleeve. It will be appreciated that the length of the sleeve can be a multiple of the length of the rivet shaft, so that the opening and reriveting operations can be repeated several times, as long as there is room in the sleeve into which the cut-off rivet shafts can be pushed.

In the third embodiment, the sleeve is constituted by a tube open at both ends, but without flanges at either of them. Rivets are pushed into it from both sides. The length of the shaft of at least one of the two rivets (obviously they both need not be equally long) is less than or equal to the length of free space left in the sleeve when both rivets are fully pushed into place.

It will be appreciated that even in this case, if the general constructional circumstances allow it, this free space preferably is several times longer than the shaft length, thus enabling repeated reopening and reriveting.

While the inner wall of the sleeve and the surface of the rivet shaft in general will be smooth and e.g. cylindrical, it is also possible that retaining means, and in particular cooperating retaining means such as corresponding protrusions and recesses, can be arranged on the rivet shaft and/or the sleeve making one of the parts partly resilient and establishing thus a detachable form-fitting engagement between the rivet and the sleeve.

The sleeve and/or the rivet or rivets can be made of any suitable material allowing partial compression to obtain a fast fit, or, if the fit is to be secured by cementing or a disengageable shape engagement, of any material at all suitable for the purpose. It will be appreciated that while the relation between the outer diameter of the rivet or rivets and the inner diameter of the sleeve is of importance for the mutual fit of these parts, the fit between the rivet connection as a whole and the parts held together by it is determined by the outer diameter of the sleeve regardless of the conditions inside the sleeve.

BRIEF DESCRIPTION OF THE DRAWING

In order that the invention may be more readily understood, and so that further features thereof may be appreciated, specific embodiments thereof will now be described by way of example and with reference to the accompanying drawing in which:

FIG. 2a is a diagrammatic plan view of the first jaw means of FIG. 1;

FIG. 2b is a view of a blade with arcuate profile which can be used as one of the blades of FIG. 2a;

SPECIFIC DESCRIPTION

Figure 1:
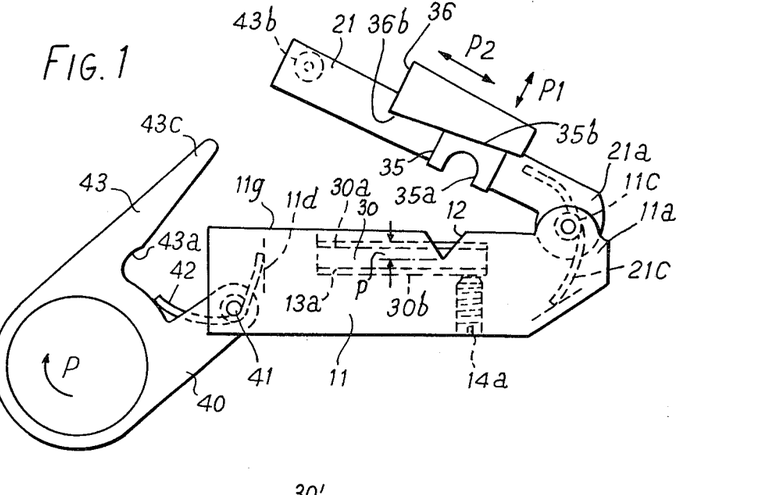
FIG. 1 is a diagrammatic side-elevational view of a wire-stripper according to the present invention.
Figures 2A, 2B:
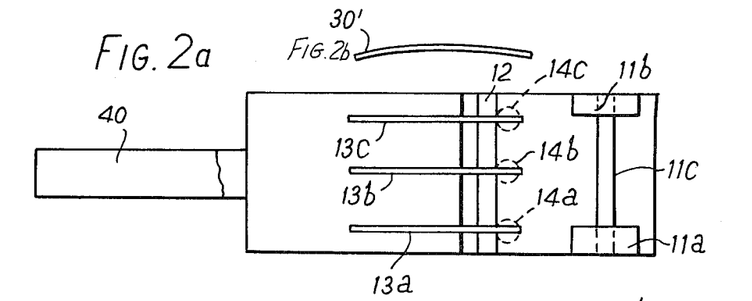

Referring to FIGS. 1 and 2, the wire stripper 10 has a first jaw means 11 and a second jaw means 21, both substantially planar and flat shape. The two jaw means 11, 21 are hinged together by hinge means constituted by ears 11a, 11b, an axle (pintle) 11c and an ear 21a and are biased by a spring 21c into their open position shown in FIG. 1.

No conventional handle means are attached to the jaw means e.g. beyond the hinge means, so that the device is very compact.

A V-shaped indentation 12 traverses the upper face of the first jaw means 11 and forms a bed or support means for the treated object (not shown). Three longitudinal slots 13a, 13b, 13c are further arranged in the first jaw means 11 for reception in one or more of them of one or more cutting blades 30, each formed with cutting edges 30a, 30b at both sides. The blade 30 protrudes by a predetermined amount p, governed by the relation between the breadth of the blade and the depth of the slots 13a, 13b, 13c, into the support means 12. The blade 30 is by any desired means retained in the slots 13a, 13b, 13c, e.g. by having a slightly arcuated profile before insertion as shown at 30' in FIG. 2. Insertion and removal of the blade can be effected with a pair of pliers adapted to grip the blade where it protrudes into the V-shaped indentation 12.

By providing only one of the slots with a blade, a device for stripping single-core cables is provided. By providing two or three of the slots with blades which in the earlier explained manner protrude by different amounts beyond the bottom of the V-shaped indentation 12, a tool for stripping coaxial cables is provided.

In the first jaw means 11, under each of the slots 13a, 13c, an adjusting screw 14a, 14b, 14c is threaded. By turning these screws the fine adjustment of the blades 30 is executed. It will be appreciated that it is immaterial whether the cutting edge 30a is exactly parallel with the upper face 11 of the first jaw means 11 or not. A gripping means embodied in an eye 40 is hinged by means of a pin 41 to the first jaw means 11 and is urged by a torsion spring 42 into its open position shown in FIG. 1.

In the second jaw means 21, a counter-support means or bed defined by a block 35 with a semiconductor recess 35a or a V-shaped recess and an inclined guiding face 35b is arranged for adjusting in the sense of the double headed arrow P1. To achieve this adjustment, a slide 36 with a correspondingly inclined guiding face 36b is displaceable in the sense of the double headed arrow P2 arranged on the second jaw means 21. Advantageously the slide 36 is provided with some conventional mechanism for locking in a chosen position such as a spring-loaded detent cooperating with a series of recesses, so that the slide cannot inadvertently be moved by the pressure executed on it by the block 35), and/or by a scale device such as a window or pointer cooperating with a scale enabling the actual setting being read off, preferably in terms of diameters of treated objects.

A locking means is integrated with the gripping means eye 40 and embodied in a protruding finger 43 with a shallow recess 43a for engagement with a contact element in the second jaw means 21, embodied in a roller 43a. It will be appreciated that the finger 43 also is able, before it performs its locking function, to fulfill the function of a lever which helps to close the two jaw means 11, 21 upon one another. When the treated object is laid on the support means 12 and the second jaw means 21 is closed upon it, the tip 43c of the finger 43 will already reach the roller 43b. When then the eye or locking means 40 is pushed in the sense of the arrow P, the finger 43 acts as a lever on the roller 43b and presses the second jaw means 21 upon the first one 11, overcoming the resistance of the treated object and pressing this object onto the blade or blades 30. When the recess 43a reaches the roller 43b, the device is closed thanks to a snap effect.

Figure 3:
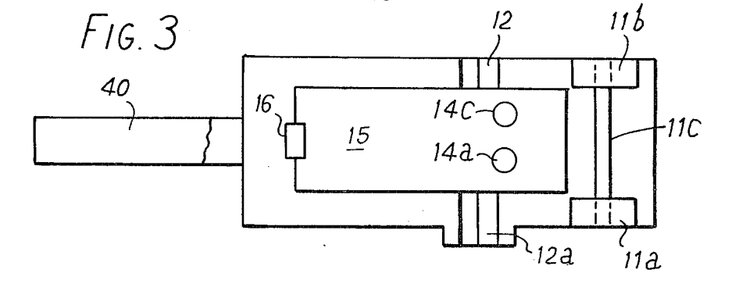
FIG. 3 is a diagrammatic view of another embodiment of the first jaws of FIG. 1 adapted for receiving a removable insert or cartridge.
Figure 4:
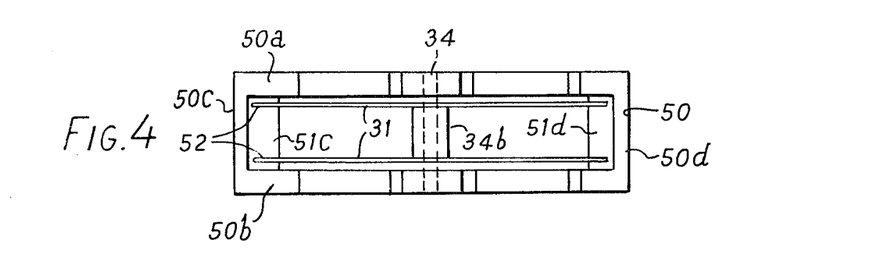
FIGS. 4 and 5 are a plan view and a side-elevational view, respectively, to a somewhat larger scale, of this removable insert or cartridge.
Figure 5:
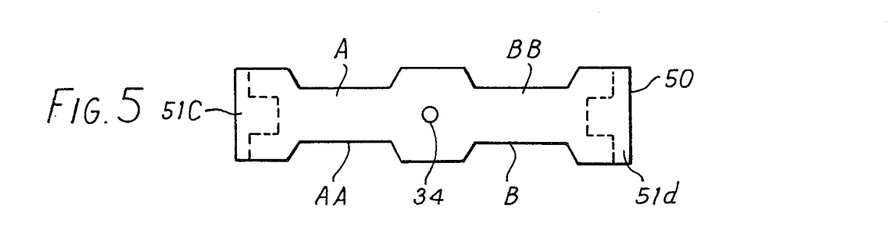

According to FIG. 3, a rectangular recess 15 is arranged in the first jaw means 11 for receiving an insert according to FIGS. 4 and 5. The insert 50 has two long sides or walls 50a, 50b and two short sides or walls 50c, 50d. In the midst of the long sides 50a, 50b (rod-shaped (cylindrical) member 34 is arranged on which two blades 31 are threaded (slipped-on) by their circular holes 34a (FIG. 6), as well as a distance sleeve 34b (FIG. 4) 51c, 51b (adjacent) the short walls 50c, 50d slots such as 52 for the reception of the terminal parts of the blades 31 are arranged.

Figures 6A, 6B:
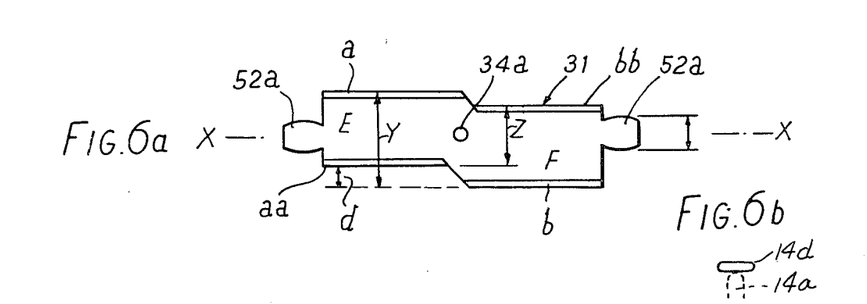
FIG. 6a is an elevational view of a preferred embodiment of a cutting blade, suitable also for use in the insert of FIGS. 4 and 5.
FIG. 6b is a diagram showing the use of a support plate.

The blades 31 can have the conventional shape substantially of a single elongated parallelogram, one blade being somewhat broader than the other, or preferably the particular shape which is shown in greater detail in FIG. 6.

This shape can be described as substantially including two adjacent congruous rectangular parallelograms E and F displaced one in relation to the other by an amount d. The four horizontal edges of the blade shown in the drawing embody four cutting edges a, aa, b, bb. The cutting edges a and b are more remote from the common axis of symmetry x—x and one from the other (Y) than the other two cutting edges aa, bb, are (Z). At its two ends, the blade 31 is provided with engagement parts 52a for insertion into the slots 52. The engagement parts 52a have arcuate Y edges for better guiding in said slots (the vertical edges) and better engagement with the adjustment screws 14a, 14b (FIG. 3). These screws are placed in the jaw means 11 in such a manner that they clear the walls of the insert 50 and engage only the blades 31. To allow for greater freedom in the axial positioning of the blades in the insert, a support plate 14d (FIG. 6b) can be arranged in the recess 15 and in the insert 50 respectively. This support plate then takes up the movements of the adjusting screws such as 14a at its underside and communicates them at its upper side to the blades in arbitrary axial position.

In the walls of the insert 50 recesses A, AA, B and BB are disposed (FIG. 5), behind which the cutting edges designated by corresponding small letters of the blade 31 will lie when the said blade is set in the insert in the position shown in FIG. 6.

The blade 31 can also be set into the insert 50 in a reverse position, where its part F is at the left hand side and part E at the right one. Then the "lower" cutting edge bb will lie behind the recess A etc.

It will be appreciated that thus with the help of a single type of a blade, an insert adapted for cuttiing a coaxial cable in two different depths can be provided, simply by arranging the two blades 31 of FIG. 4 in the said relatively reversed manner.

From FIG. 3, it can be seen that only the cutting edge which lies behind the recess BB and that cutting edge (not shown), which lies behind a corresponding recess in the other long wall 50a, are operative.

When the lower blade 31 in FIG. 4 is in the position shown in FIG. 6a, and the upper one in the reversed position, of the two incisions made in a treated object resting in the support 12, the incision closer to the screw 14a will be more shallow than the one nearer the screw 14c. In the embodiment shown in FIG. 3, a protrusion 12a of the support means 12 indicates the side of the shallower incision and serves simultaneously as a guide. A coaxial cable is placed in the device with its free end at the other side than where the protrusion 12a is.

Fresh cutting edges may be brought into operative position adjacent the support means 12 either by turning the blades 31 around the member 34 in the insert 50, or by turning the whole insert upside down or from left to right. Unless however the member 34 is removed and the left and right sides of the blades 31 in the insert interchanged, a shallow cutting edge will, at all the above named reversals, always come to lie adjacent the protrusion 12a, and a deeper cutting edge at the opposite end of the support means 12. This holds true if e.g. only one of the blades 31 were rotated around the member 34, and the other remained without change, too.

Either another insert with a single central pair of slots such as 52 for only one blade, or an identical insert "charged" only if one of its two pairs of slots 52 with a blade can be provided for swift conversion of the appliance to one for stripping single-core cables. Alternatively, it may often suffice to put in a single-core cable in reversed sense, i.e. with the free end towards the protrusion 12a, to obtain a satisfactory stripping, as it is of no importance that on the discarded part of the insulation another shallower incision will be made.

A locking means 16 whose function it is to keep the insert 50 in its place can preferably be defined by a pivotally arranged hook which expediently can be biased into the locking position by the same spring 42 (FIG. 1) which biases the locking means 40. Spring 42 is a compression spring which at one of its ends is anchored in the eye 40 and at its other end at a stop 11d in the first jaw means 11. It will be readily understood that the use of a blade 31 according to FIG. 6 is not limited to the simultaneous use of an insert according to FIGS. 4 and 5, or vice versa.

Figure 7:
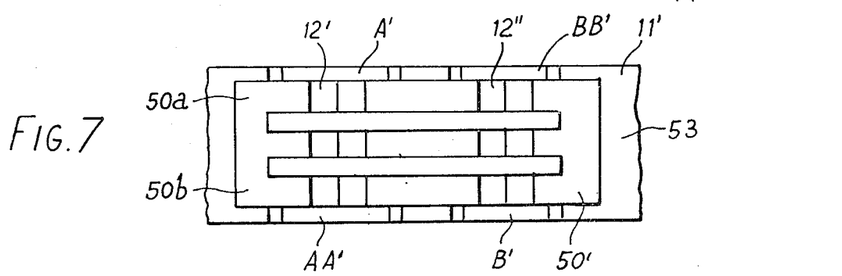
FIG. 7 is a plan view of an alternative embodiment of an insert.

In the alternative embodiment of an insert 50' according to FIG. 7, the long side walls 50a, 50b are made thicker and provided with support means in the form of V-shaped indentations 12' and 12". The adjacent lateral portions of the first jaw means 11' are made thinner than in FIG. 3 and are provided with larger recesses A', B', AA', BB' corresponding to those shown in FIG. 4 in the insert 50.

Figure 8A:
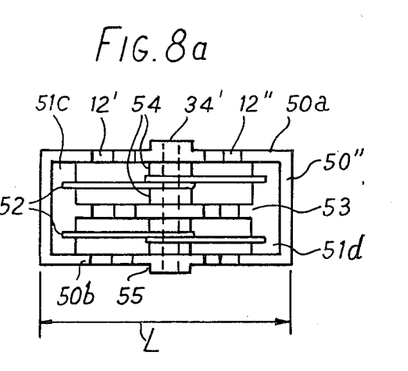
FIGS. 8a and 8b are a plan view and a side-elevational view, respectively, of still another embodiment of an insert.
Figure 8B:
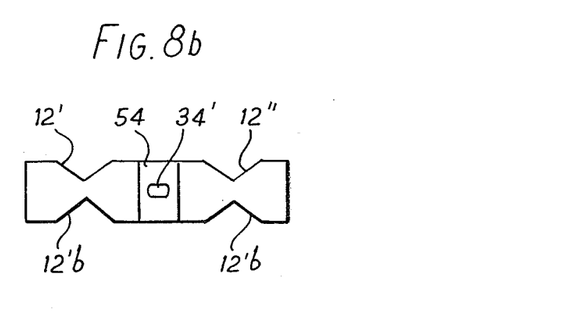
Figure 9:
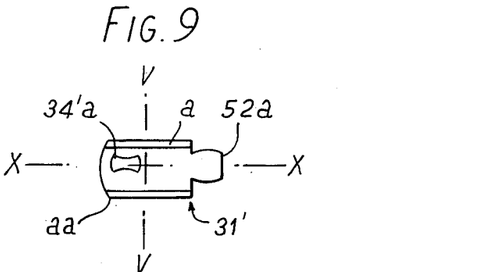
FIG. 9 is a plan view of another embodiment of a cutting blade.

Besides this, at least one central beam 53 divides the free space in the insert 50' axially into at least two portions, each for one blade. The blades get in this manner better backing, and the treated object gets better support by the longer support means. Obviously, support means can be arranged as well in the first jaw means, as in the insert, i.e. a combination of the embodiments according to FIGS. 3 (support means in the jaw means) and 7 (support means in the insert) is quite feasible. Further, the support means can as already stated, have another shape than that of V-shaped indentation, such as e.g. that of a semicircular indentation shown in FIG. 1 for the counter-support means, etc. In FIGS. 8a and 8b a further alternative of the insert, and in FIG. 9 another embodiment of a blade, are shown.

An insert 50" has adjacent its central beam 53 and the inner face of the long walls 50a, 50b, in the central area thereof, bulges such as 54 which offer good guiding for the blades. Through the bulges 54 passes the rod-shaped member 34'. The bulges apparently also fill the function of the distance sleeve 34b (FIG. 4). On the outer faces of the long walls 50a, 50b are protrusions 55 arranged for which corresponding grooves (not shown) are disposed in the inner faces of the rectangular recess 15 (FIG. 3). The overall length L of the insert 50" is for easier manipulation expediently somewhat shorter than the corresponding length of the recess 15. The straight recesses A, AA, B, and BB of the insert 50 according to FIG. 5 are replaced by V-shaped recesses 12', 12" on all edges of the long walls 50a, 50b.

Figure 10A:
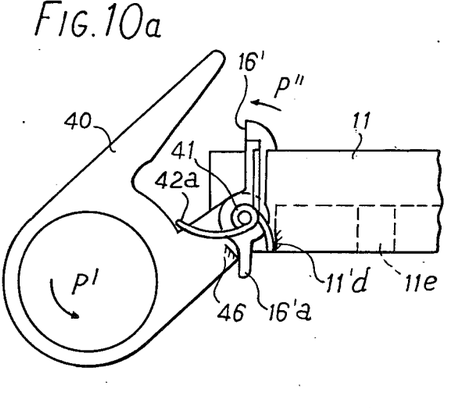
FIGS. 10a and 10b are a side-elevational view and a front end view, respectively, diagrammatically illustrating an alternative embodiment of a locking means for an insert.
Figure 10B:
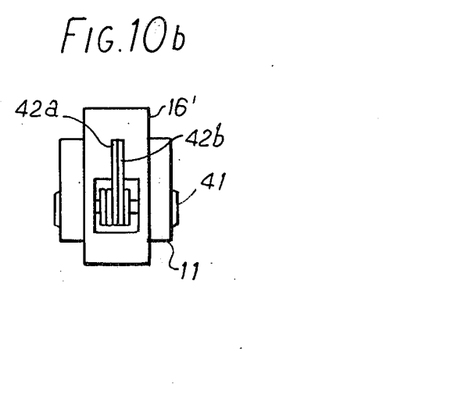

The rod-shaped member 34' has not a circular cross-section, but a cross-section with two planar faces, evident from FIG. 8b. The purpose of this measure is to safely accommodate a modified blade 30" according to FIG. 9. Substantially, this blade 30" corresponds to the right hand half of the blade 30 shown in FIG. 6. It will be appreciated that by combining the blade 30" with another identical blade 30", turned around with 180° about as well axis x—x, as axis v—v, and bringing the openings 34'a of both blades 30" in alignment, these two blades 30" will constitute an equivalent to blade 30 according to FIG. 6, and it is easier to manufacture blades 30" than blades 30. The blade 30" would however be liable to rotate about a cylindrical rod such as in FIG. 5, e.g. when the treated object is withdrawn from the applicance. To prevent this, the said planar surfaces are arranged on the rod 34'. To allow however a limited rotation in response to the adjustment by the adjustment screws 14a etc. (FIG. 2a), the "horizontal" edges of the opening 34' in the blade 30" have the shape of a biconcave lens, whereas the "vertical" edges correspond to the circular "vertical" edges of the rod-member 34'. It will be appreciated that the described arrangement also is applicable with a blade according to FIG. 6a, but is unnecessary there, because the blade anyhow cannot rotate about the rod 34. In FIGS. 10a and 10b, a modified arrangement of the pivotally arranged hook 16 serving as locking means for the insert 50, 50' is shown. Hook 16' is provided with a protrusion 16'a extending beyong the pin 41 and cooperating with a stop 46 on the gripping means 40. A first biasing spring 42a is, as in FIG. 1, wound on the pin 41 and at its one end anchored at the gripping means 40, however, at the other end, spring 42a is anchored on the hook 16', on the rear face thereof. On the pin 41 is a second biasing spring 42b, which is an expansion spring, wound adjacent to spring 42a, and anchored at the rear face of the hook 16', also adjacent to the spring 42a, and at a stop 11'b in the first jaw means 11. The arrangement works as follows:

When opening the device, the eye 40 us pushed downwards in sense of arrow P', overcoming the engagement of the roller 43b in the recess 43a (FIG. 1). Spring 42a urges then the eye 40 into the position shown in FIG. 10a where members 46 and 16a abut, and with closing, the same process takes place as described in connection with FIG. 1.

If it is however desired to remove the insert 50 or 50", the eye 40 is, from the position of FIG. 10a pushed further downward in the sense of arrow P', overcoming now the effect of the expansion spring 42b, and through the continued engagement of the members 46 and 16'a, the hook 16' is swung backwards in the sense of the arrow P", and releases the insert. For convenience, an opening 11e may be arranged in the lower portion of the first jaw means 11, through which opening a screwdriver or the like may be introduced to push out the released insert.

Preferably, the biasing spring 21c working between the two jaw members 11, 21 (FIG. 1) may be at its one end anchored in suitable grooves in the counter-support means 35, instead of directly in the second jaw means 21, as shown in FIG. 1. Said counter-support means 22 may then be retained on its place in the second jaw means 21 only by this biasing spring (or two identical such biasing springs adjacently arranged on the axle 11c) which presses the block 35, defining the counter-support means, against the slide 36. Said block 35 can thus readily be exchanged for another one with a different recess 35a for receiving different objects.

Figure 11:
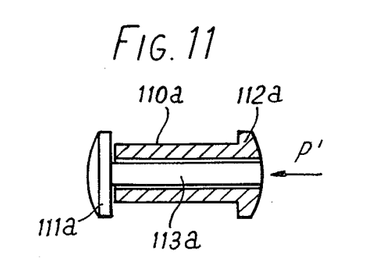
FIG. 11 is a diagrammatic cross-section through a first embodiment of a rivet assembly according to the invention.

The pins or axles 11c and 41 are conveniently formed by rivet assemblies as described below:

Referring to FIG. 11, a longitudinal hollow sleeve 10a is open at both ends and at one end of the right hand end in the drawing is provided with an integral flange 112a. At assembly, the sleeve 110a is inserted into the aligned openings of the parts to be connected in the same way as shown in detail in FIG. 13, whereupon from the end opposite the flange 112a a rivet with a head 111a and a shaft 113a is pushed into the sleeve. The sort of fit between the shaft 113a and the sleeve 110a is chosen according to the materials involved in such a way, that a firm connection is established which however may be overridden by application of a certain force in the direction of the arrow P'.

It is obvious that the shaft 113a in this embodiment may be of any length and even protrude from the flange 112a.

Figure 12A:
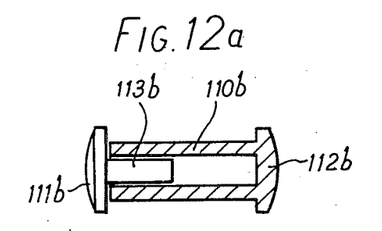
FIGS. 12a and 12b are diagrammatic cross-sections through a second embodiment of the rivet assembly.
Figure 12B:
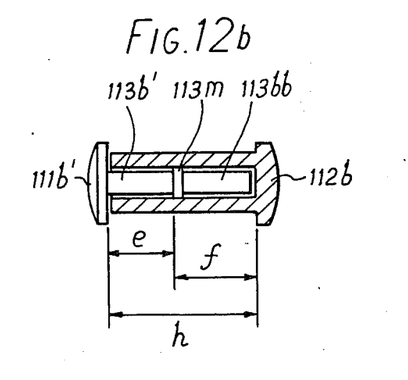

According to FIG. 12a, the flange 112a of FIG. 11 has been replaced by a head 112b which covers also the opening in the sleeve 110b at one end thereof. A rivet with a head 111b has a shaft 113b, the length e of which is less than equal to the remaining part f of the total length h of the sleeve 110b when the rivet is fully pushed in place (FIG. 12b).

When such a connection has to be opened, the head 111b must be cut off or ground off, whereupon a pushing force is applied at the shaft 113b in the same direction in which the rivet originally was driven in. This pressure on the newly exposed surface 113m brings the cut off shaft 113b into the position shown in FIG. 12b. The connection can now be disassembled. Upon reassembly, a new rivet 111b' is pushed into the place of the old one.

Figure 13:
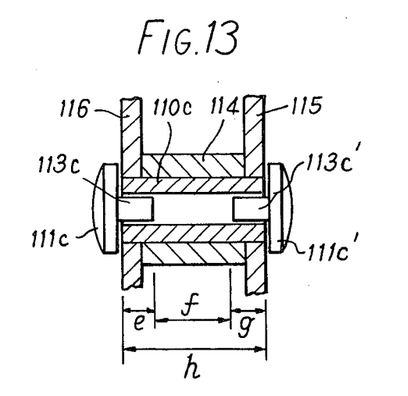
FIG. 13 is a diagrammatic cross-section through a third embodiment of the rivet assembly.

According to FIG. 13, the sleeve 110c is open at both ends as in FIG. 11, but has no flange. Similar or even identical rivets 111c, 113c and 111c' are pushed into it from both ends. The lengths e, g of their shafts 113c, 113a respectively must be such that the remaining part (free space) f of the total length h of the while sleeve 110c is more than or equal to one of the shaft lengths.

The parts 114, 115, 116 held together by a rivet connection according to the present invention are in contact only with the outer wall of the sleeve 110a, 110b, 110c and each part may have a different fit, e.g. part 114 being mounted rotatably.

Figure 14:
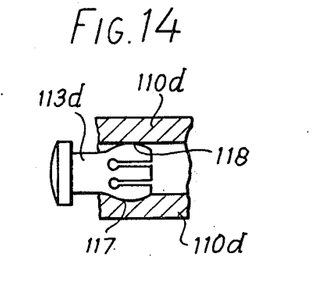
FIG. 14 is a view of an alternative embodiment of a rivet applicable in connection with all embodiments.

In FIG. 14 a preferred rivet with a resilient shaft 113d is shown, which can be used in any of the embodiments shown. In the inner wall of the sleeve 110d a depression 117 corresponding to the bulge 118 on the shaft 113d may be arranged (as shown in the lower part of FIG. 14 or not (as shown in the upper part of FIG. 114; a stronger engagement will be achieved in either case.

Although in the case with a depression or recess 117 in the sleeve there is a shape engagement between the sleeve and the shaft, it is a disengageable and re-assemblable engagement as opposed to the deformed shaft according to previously proposed methods.

We claim:

1. A wire stripper comprising;
a pair of elongated rigid jaws hinged together at one end by an axle pin, one of said jaws being formed with at least one blade having a cutting edge turned toward the other jaw, said other of said jaws being formed with a bed open in the direction of said one of said jaws and formed with a notch open toward said blade and adapted to receive a wire whose insulation is partially incised by said edge upon the clamping of said jaws together about said wire;
latch means at the other end of said jaws to lock said jaws in a closed position about said wire;
a finger-receiving eye connected to one of said jaws for enabling the wire stripper to be twirled about by the finger of a user to effect relative rotation of the wire and the jaws when the same are clamped upon said wire, thereby extending the incision formed by said edge about the entire circumference of the said insulation; and
a cartridge replaceably received in said one of said jaws and carrying said blade and detent means on said one of said jaws engageable with said cartridge for retaining same immovably on said one of said jaws.

2. The wire stripper defined in claim 1, further comprising a torsion spring between said jaws at said one end for urging said jaws apart into a open position.

3. The wire stripper defined in claim 1 wherein said cartridge is provided with a plurality of mutually parallel transversely spaced blades at least two of which are engageable simultaneously with a wire to be stripped upon clamping of said jaws.

4. The wire stripper defined in claim 1, further comprising
at least one screw threaded into said one of said jaws and bearing upon said blade for adjusting the level thereof in said one of said jaws.

5. A device as defined in claim 1 wherein said axle pin comprises a longitudinal hollow sleeve and at least one rivet having a head and a shaft, the rivet being arranged to be introduced into the sleeve and to be retained therein by friction, an adhesive or deformation of its shape, and to be axially displaceable by the action of a force applied to one end of the shaft or to a surface substantially parallel to said end formed as a result of removal of the rivet head.

6. A device according to claim 5, in which the sleeve is provided with an integral retaining flange at the opposite end to that at which the rivet is to be introduced.

7. A device according to claim 5, in which the sleeve is provided with an integral head at the opposite end to that at which the rivet is to be introduced and the length of the shaft of the rivet is at most equal to the remaining free space in the sleeve when the rivet is fully inserted in the sleeve.

8. A device according to claim 5, in which the sleeve is adapted for having rivets introduced from both sides and the length of the shaft of at least one of the two rivets is at most equal to the free space left in the sleeve when both rivets are fully inserted in the sleeve.

9. A device according to claim 5 in which the rivet shaft and/or the inner wall of the sleeve is/are provided with retaining means.

10. A wire stripper comprising:
a pair of elongated jaws hinged together at one end, one of said jaws being formed with at least one blade having a cutting edge turned toward the other jaw, said other of said jaws being formed with a bed open in the direction of said one of said jaws and adapted to receive a wire whose insulation is partially incised by said edge upon the clamping of said jaws together about said wire;
latch means at the other end of said jaws to lock said jaws in a closed position about said wire;
a finger-receiving eye on one of said jaws for enabling the wire stripper to be twirled about by the finger of a user to effect relative rotation of the wire and the jaws when the same are clamped upon said wire, thereby extending the incision formed by said edge about the entire circumference of the said insulation;
a cartridge replaceably received in said one of said jaws and carrying said blade; and detent means on said one of said jaws engageable with said cartridge for retaining same in said one of said jaws, said eye forming part of a lever engaging said detent means for releasing said cartridge from said one of said jaws upon displacement of said lever relative to said one of said jaws.

11. A wire stripper comprising:
a pair of elongated jaws hinged together at one end, one of said jaws being formed with at least one blade having a cutting edge turned toward the other jaw, said other of said jaws being formed with a bed open in the direction of said one of said jaws and adapted to receive a wire whose insulation is partially incised by said edge upon the clamping of said jaws together about said wire;
latch means at the other end of said jaws to lock said jaws in a closed position about said wire;
a finger-receiving eye on one of said jaws for enabling the wire stripper to be twirled about by the finger of a user to effect relative rotation of the wire and the jaws when the same are clamped upon said wire, thereby extending the incision formed by said edge about the entire circumference of the said insulation; and
a lever forming part of said latch means and pivotally mounted on said one of said jaws and having a projection engageable with said one of said jaws and said other end, and a torsion spring between said lever and said one of said jaws biasing said lever into a position in which it is disengaged from said other jaws.

12. The wire stripper defined in claim 11 wherein said eye is a ring formed on said lever.

13. A wire stripper comprising:
a pair of elongated jaws hinged together at one end, one of said jaws being formed with at least one blade having a cutting edge turned toward the other jaw, said other of said jaws being formed with a bed open in the direction of said one of said jaws and adapted to receive a wire whose insulation is partially incised by said edge upon the clamping of said jaws together about said wire;
latch means at the other end of said jaws to lock said jaws in a closed position about said wire;

a finger-receiving eye on one of said jaws for enabling the wire stripper to be twirled about by the finger of a user to effect relative rotation of the wire and the jaws when the same are clamped upon said wire, thereby extending the incision formed by said edge about the entire circumference of the said insulation; and means on said other of said jaws for displacing said bed toward and away from said one of said jaws.

14. The wire stripper defined in claim 13 wherein the last mentioned means includes a slide shiftable longitudinally along said other of said jaws and having a planar surface inclined to its direction of displacement, said bed having an inclined surface engaging said inclined surface of said slide whereby longitudinal displacement of said slide cams said bed toward said blade.

15. The wire stripper defined in claim 14, further comprising indexing means between said slide and said other jaws for indexing said slide in a select one of a plurality of longitudinally spaced positions corresponding to wires of different diameters.

16. A hand-operated device for removing the sheathing from a substantially rod-shaped article, in particular for stripping the insulation from an electrical cable or the like, said device comprising:

substantially planar first and second rigid jaw means;
hinge means defined by an axle pin for pivotally connecting the said jaw means with one another;
cutting means in said first jaw means for partially incising said sheathing;
support means in said first jaw means for retaining the article in a predetermined position along said cutting means;
counter-support means in the second jaw means opposite the said support means, adapted to press the treated object onto the support means when the jaw means are closed one upon the other; and
jaw locking means including a pivotal latch member swingable relative to said jaw means for temporarily but positively locking both jaw means in their said closed position, said cutting means protruding to a predetermined extent beyond the support means for effecting said incision to a predetermined depth.

17. The device defined in claim 16, further comprising a gripping means attached to at least one of the jaw means for relative rotation of the device around the article.

18. The device defined in claim 16, in which at least one of the said support means and counter-support means is defined by a V-shaped bed.

19. The device defined in claim 16 in which at least one of said support and counter-support means is defined by a bed in the shape of a circular arch.

20. The device defined in claim 16 in which the position of the counter-support means is adjustable in the direction to and from the support means.

21. The device defined in claim 20, wherein said counter-support means is provided with at least one inclined guiding face engageable with at least one correspondingly inclined engagement face on a slide mounted for movement to and fro on said second jaw means.

22. The device defined in claim 16, further comprising spring means whereby the two jaw means are biased into their open position.

23. The device defined in claim 16 wherein the locking means and the gripping means are formed as one piece.

24. The device defined in claim 23 wherein the gripping means has the shape of an eye which can be threaded on a finger and which is pivotally connected to one of the jaw means and provided with a protrusion positioned for snap engagement with a contact element on the other jaw means.

25. The device defined in claim 16 wherein the cutting means is constituted by at least one cutting blade with at least one cutting edge, said cutting blade being mounted in the said first jaw means for easy insertion thereinto in a plurality of relative positions and for easy removal therefrom.

26. The device defined in claim 25 wherein said cutting means is mounted in a removable insert, and the said first jaw means are provided with a recess for receiving said insert adjacent said support means.

27. The device defined in claim 26, further comprising locking means to retain said insert in said recess at least in the open position of the jaw means.

28. The device defined in claim 26, wherein said insert is constructed and arranged for insertion into the said recess in a plurality of relative positions in such a manner that at least in some of the said relative positions a different cutting edge part is adjacent the said support means.

29. The device defined in claim 26 wherein the said insert has substantially the shape of a four wall box.

30. The device defined in claim 25 wherein said blade is mounted on a rod-shaped member.

31. The device defined in claim 26 wherein in adjacent side walls of the insert, which are perpendicular to the blade, slots for engagement with the blade are formed.

32. The device defined in claim 26 wherein said first jaw means is provided with means for adjusting the height position of the operative cutting edge on a blade relative the support means.

33. The device defined in claim 32 wherein the adjusting means is constituted by at least one screw which from the outside is screwed into the bottom of the first jaw means and which displaces the blade inside the said first jaw means.

34. The device defined in claim 26 wherein said insert comprises said support means for the article.

35. The device defined in claim 26 wherein the inner space of the insert is divided into at least two portions by at least one central beam.

36. The device defined in claim 16 wherein said locking means is constructed and arranged to act with a lever force on one of the jaw means before the final locked position is reached.

37. The device defined in claim 26, further comprising a rod-shaped member positioned to pass through a series of adjacent bulges on inner walls in the insert, between which bulges free spaces dimensioned so as to retain therein the desired number of blades are arranged, said blades being traversed by said rod-shaped member.

38. A device for removing the sheathing from a substantially rod-shaped article, in particular for stripping the insulation from an electrical cable or the like, said device comprising:

substantially planar first and second jaw means;
hinge means for pivotally connecting the said jaw means with one another;

cutting means in said first jaw means for partially incising said sheathing;

support means in said first jaw means for retaining the article;

counter-support means in the second jaw means opposite the said support means, adapted to press the treated object onto the support means when the jaw means are closed one upon the other;

jaw locking means for temporarily locking both jaw means in their said closed position, said cutting means protruding to a predetermined extent beyond the support means for effecting said invision to a predetermined depth; and spring means whereby said jaw locking means is biased into its open position.

39. A device for removing the sheathing from a substantially rod-shaped article, in particular for stripping the insulation from an electrical cable or the like, said device comprising:

substantially planar first and second jaw means;

hinge means for pivotally connecting the said jaw means with one another;

cutting means in said first jaw means for partially incising said sheathing;

support means in said first jaw means for retaining the article;

counter-support means in the second jaw means opposite the said support means, adapted to press the treated object onto the support means when the jaw means are closed one upon the other;

jaw locking means for temporarily locking both jaw means in their said closed position, said cutting means protruding to a predetermined extend beyond the support means for effecting said incision to a predetermined depth; the cutting means being constituted by at least one cutting blade with at least one cutting edge, said cutting blade being mounted in the said first jaw means for easy insertion thereinto in a plurality of relative positions and for easy removal therefrom, said cutting means being mounted in a removable insert, and the said first jaw means are provided with a recess for receiving said insert adjacent said support means, an edge of said insert adjacent an operative zone of said cutting edge on said blade being formed with at least one recess for unimpeded action of the cutting edge.

40. A device for removing the sheathing from a substantially rod-shaped article, in particular for stripping the insulation from an electrical cable or the like, said device comprising:

substantially planar first and second jaw means;

hinge means for pivotally connecting the said jaw means with one another;

cutting means in said first jaw means for partially incising said sheathing;

support means in said first jaw means for retaining the article;

counter-support means in the second jaw means opposite the said support means, adapted to press the treated object onto the support means when the jaw means are closed one upon the other;

jaw locking means for temporarily locking both jaw means in their said closed position, said cutting means protruding to a predetermined extent beyond the support means for effecting said incision to a predetermined depth, the cutting means being constituted by at least one cutting blade with at least one cutting edge, said cutting blade being mounted in the said first jaw means for easy insertion thereinto in a plurality of relative positions and for easy removal therefrom, said blade having at least two cutting edges at different protrusion levels.

41. The device defined in claim 40 wherein said blade substantially has the shape of two adjacent congruous rectangular parallelograms which are parallely displaced one relative the other by a predetermined distance, the four mutually parallel edges of the said parallelograms embodying the cutting edges.

42. The device defined in claim 40 wherein the blade has at least one terminal part for engagement with adjustment means at an invariable level irrespective of the different levels of the cutting edges.

43. A device for removing the sheathing from a substantially rod-shaped article, in particular for stripping the insulation from an electrical cable or the like, said device comprising:

substantially planar first and second jaw means;

hinge means for pivotally connecting the said jaw means with one another;

cutting means in said first jaw means for partially incising said sheathing;

support means in said first jaw means for retaining the article;

counter-support means in the second jaw means opposite the said support means, adapted to press the treated object onto the support means when the jaw means are closed one upon the other;

jaw locking means for temporarily locking both jaw means in their said closed position, said cutting means protruding to a predetermined extent beyond the support means for effecting said incision to a predetermined depth, the cutting means being constituted by at least one cutting blade with at least one cutting edge, said cutting blade being mounted in the said first jaw means for easy insertion thereinto in a plurality of relative positions and for easy removal therefrom, said cutting means being mounted in a removable insert, and the said first jaw means being provided with a recess for receiving said insert adjacent said support means, said insert being provided with insert locking means to retain said insert in said recess at least in the open position of the jaw means, said insert locking means being constituted by a pivotable hook provided with a protrusion adapted for engagement with the jaw locking means in their normally open position, a first biasing spring effective between the said jaw locking means and the said pivotable hook, and a second biasing spring effective between the pivotable hook and the first jaw means, upon said jaw locking means being opened beyond their normally open position, the pivotable hook by overriding said second biasing spring being moved into a position for releasing the insert.

44. A device for removing the sheathing from a substantially rod-shaped article, in particular for stripping the insulation from an electrical cable or the like, said device comprising:

substantially planar first and second jaw means;

hinge means for pivotally connecting the said jaw means with one another;

cutting means in said first jaw means for partially incising said sheathing;

support means in said first jaw means for retaining the article;

counter-support means in the second jaw means opposite the said support means, adapted to press the treated object onto the support means when the jaw means are closed one upon the other;

jaw locking means for temporarily locking both jaw means in their said closed position, said cutting means protruding to a predetermined extent beyond the support means for effecting said incision to a predetermined depth, the cutting means being constituted by at least one cutting blade with at least one cutting edge, said cutting blade being mounted in the said first jaw means for easy insertion thereinto in a plurality of relative positions and for easy removal therefrom, said blade being mounted on a rod-shaped member, said rod-shaped member having non-circular cross-section and said blade having an opening receiving said rod member and of a shape adapted to prevent greater rotation of the blade about the rod-shaped member, but to allow limited rotational adjustment movements.

* * * * *